(12) United States Patent
Torai et al.

(10) Patent No.: US 11,357,227 B2
(45) Date of Patent: Jun. 14, 2022

(54) FRAME AND ORGAN HOLDER

(71) Applicant: SCREEN HOLDINGS CO., LTD., Kyoto (JP)

(72) Inventors: Shinji Torai, Kyoto (JP); Syuhei Yoshimoto, Kyoto (JP); Katsuhide Konishi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 130 days.

(21) Appl. No.: 16/902,988

(22) Filed: Jun. 16, 2020

(65) Prior Publication Data

US 2020/0404903 A1    Dec. 31, 2020

(30) Foreign Application Priority Data

Jun. 26, 2019    (JP) .............................. JP2019-118336

(51) Int. Cl.
*A01N 1/02*     (2006.01)
*F16L 3/04*     (2006.01)

(52) U.S. Cl.
CPC .............. *A01N 1/0247* (2013.01); *F16L 3/04* (2013.01)

(58) Field of Classification Search
None
See application file for complete search history.

(56) References Cited

U.S. PATENT DOCUMENTS

| | | | | |
|---|---|---|---|---|
| 6,582,953 B2 * | 6/2003 | Brasile | ..................... | A01N 1/02 435/1.2 |
| 9,770,237 B2 * | 9/2017 | Friedrich | ............... | A61B 17/02 |
| 2008/0286746 A1 * | 11/2008 | Poo | ....................... | A01N 1/0247 435/1.1 |
| 2011/0076666 A1 * | 3/2011 | Brassil | ................. | A01N 1/0247 435/1.2 |
| 2020/0308520 A1 | 10/2020 | Torai et al. | | |

FOREIGN PATENT DOCUMENTS

| | | |
|---|---|---|
| CN | 108094403 A | 6/2018 |
| JP | 03-151303 A | 6/1991 |
| WO | 2004/089085 A2 | 10/2004 |
| WO | 2015/102524 A1 | 7/2015 |
| WO | 2019/095079 A1 | 5/2019 |
| WO | 2019/106936 A1 | 6/2019 |

OTHER PUBLICATIONS

Extended European Search Report issued in corresponding European Patent Application No. 20182153.5-1122, dated Nov. 2, 2020.

* cited by examiner

*Primary Examiner* — William H. Beisner

(74) *Attorney, Agent, or Firm* — McDermott Will & Emery LLP

(57) ABSTRACT

A frame includes a ring-shaped body part locatable to surround the periphery of an organ, and at least one tube clamp part mounted on the body part. Each tube clamp part includes a tube holder that holds a tube. The tube clamp part is mounted so as to be movable in the circumferential direction of the body part. Thus, a tube connected to the organ can be fixed at an appropriate position to the tube clamp part. This stabilizes the relative positions of the organ and the tube. Accordingly, it is possible to reduce the probability of the organ becoming damaged due to a strain on the organ.

9 Claims, 9 Drawing Sheets

FRAME AND ORGAN HOLDER

RELATED APPLICATIONS

This application claims the benefit of Japanese Application No. 2019-118336, filed on Jun. 26, 2019, the disclosure of which is incorporated by reference herein.

TECHNICAL FIELD

The present invention relates to a frame used in an organ holder for holding an organ, and to an organ holder that includes this frame.

BACKGROUND ART

In transplant operations such as liver transplantation, an organ is temporarily preserved during the period from when the organ is removed from a donor to when the organ is transplanted into a recipient. Various preservation and perfusion methods have been developed in order to preserve isolated organs in transplantable conditions. In order to preserve isolated organs, for example, a simple cooling method is known in which blood in an organ is replaced with a low-temperature organ preservation solution in order to suppress cell metabolism, and then the organ is immersed in a low-temperature preservation solution. There is also known a perfusion preservation method in which the vascular network of a preserved organ is perfused with a preservation solution for the purpose of eliminating waste materials in the organ.

For example, Japanese Patent Application Laid-Open No. 3-151303 describes a conventional device for preserving an organ outside the body. In the device described in Japanese Patent Application Laid-Open No. 3-151303, a hammock made of hydrophobic cloth is used to hold an organ.

However, the position of the organ relative to the hammock may be shifted in case the organ is simply placed in the hammock as in Japanese Patent Application Laid-Open No. 3-151303. It is thus difficult to transport the organ without damage from the donor to the recipient.

In particular, in the case of perfusion preservation, solution-sending tubes and drainage tubes, such as catheters, are connected to blood vessels of an organ in order to supply perfusate into the organ or to drain perfusate from the organ. Thus, if these tubes are shifted in position when the organ is held in the hammock, there is the problem that the organ is more likely to become damaged due to a strain on the organ.

SUMMARY OF INVENTION

It is an object of the present invention to provide a technique that is able to suppress a shift in the positions of tubes such as solution-supply tubes and drainage tubes connected to the organ, in the case of perfusion preservation of the organ.

The present invention provides a frame for holding a tube connected to an organ during perfusion preservation of the organ. The frame includes a ring-shaped body part locatable to surround a periphery of the organ, and at least one tube clamp part mounted on the body part. The tube clamp part includes a tube holder that holds the tube, and the tube clamp part is mounted so as to be movable in a circumferential direction of the body part.

According to the present invention, it is possible to fix the tube connected to the organ at an appropriate position to the tube clamp part. This stabilizes the relative positions of the organ and the tube. Accordingly, it is possible to reduce the probability of the organ becoming damaged due to a strain on the organ.

These and other objects, features, aspects and advantages of the present invention will become more apparent from the following detailed description of the present invention when taken in conjunction with the accompanying drawings.

DESCRIPTION OF EMBODIMENTS

Embodiments of the present invention will be described hereinafter with reference to the drawings. In the present application, donors and recipients may be humans, or may be non-human animals. That is, in the present application, organs including livers may be human organs, or may be organs of non-human animals. The non-human animals may be rodents such as mice and rats, ungulates such as pigs, goats, and sheep, non-human primates such as chimpanzees, or other non-human mammals, or may be nonmammalian animals.

1. First Embodiment

1-1. Configuration of Perfusion Device

Figure 1:
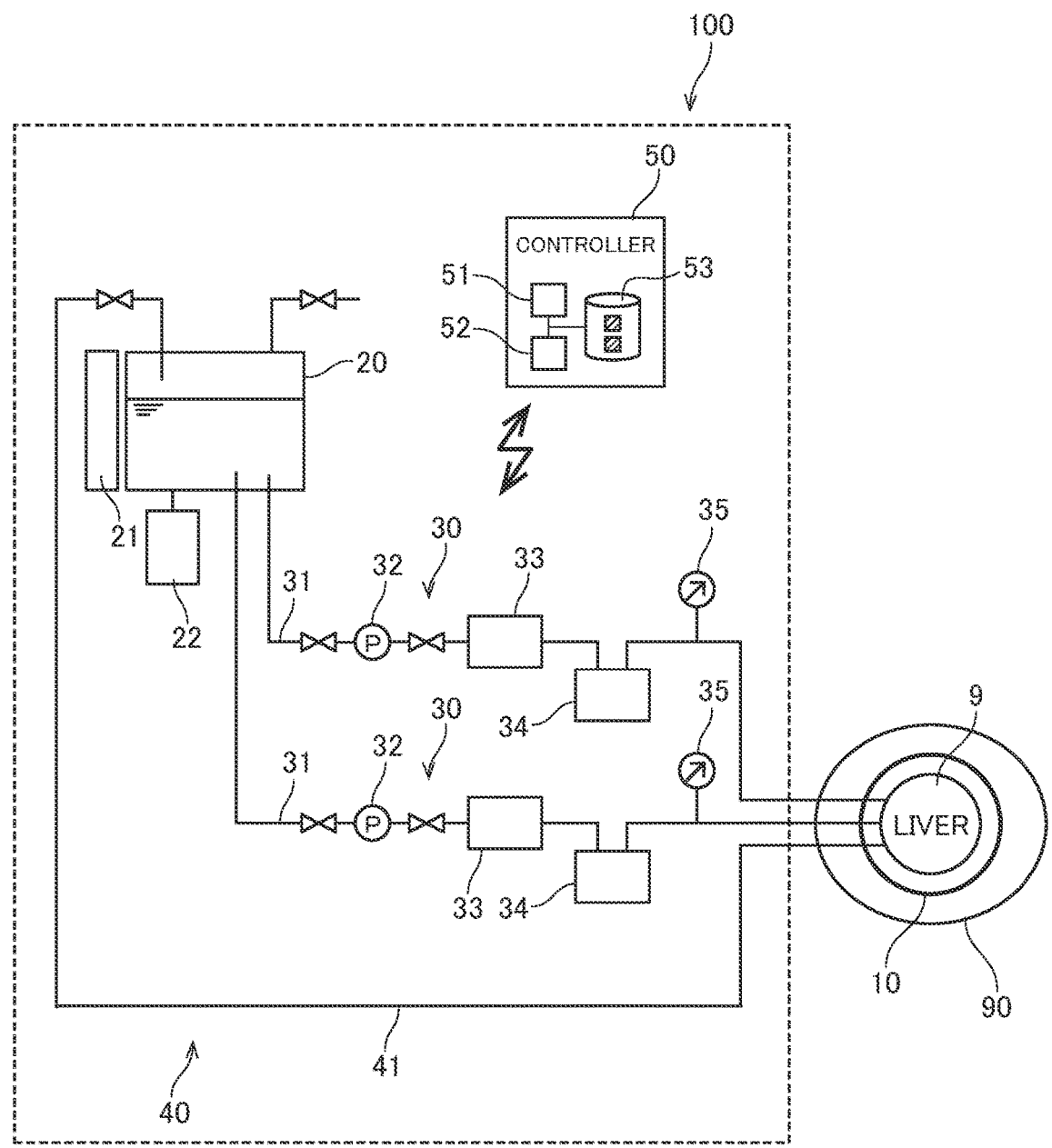
FIG. 1 is a schematic view illustrating a configuration of a perfusion device according to a first embodiment.

A case in which an organ holder 10 is used together with a perfusion device 100 will be described with reference to FIG. 1, the organ holder including a frame 1 according to a first embodiment of the present invention. FIG. 1 is a schematic view illustrating a configuration of the perfusion device 100. The details of the frame 1 and the organ holder 10 will be described later.

The perfusion device 100 is a device for temporarily preserving an organ such as a liver removed from a donor outside the body until when the organ is transplanted into a recipient. The perfusion device 100 performs perfusion while supplying perfusate to the organ. The following description is given of the case where a liver 9 is taken as an example of the organ subjected to perfusion processing.

When the perfusion device 100 provides perfusion treatment, the liver 9 is held by the organ holder 10 and housed in a reactor 90. The reactor 90 is an organ container capable of housing therein a liquid and an organ such as the liver 9 held by the organ holder 10. The reactor 90 is, for example, a cup-shaped (closed-end tubular) container.

As illustrated in FIG. 1, the perfusion device 100 includes a reservoir 20, two (two-line) perfusate inflow parts 30, a perfusate outflow part 40, and a controller 50. The number of perfusate inflow parts 30 and the number of perfusate outflow parts 40 may be one (one line) or may be two (two lines) depending on perfusion conditions or the type of the organ to be perfused.

The reservoir 20 is a container for accumulating perfusate. Around the reservoir 20, a temperature regulating mechanism 21 and a gas exchange mechanism 22 are provided. In the present embodiment, the perfusate is an ETK solution. Note that the perfusate may be any other type of perfusate such as an UW solution.

The temperature regulating mechanism 21 regulates the temperature of the perfusate accumulated in the reservoir 20. The gas exchange mechanism 22 supplies a gas such as oxygen to the perfusate accumulated in the reservoir 20 so as to cause this gas to dissolve in the perfusate. The gas exchange mechanism 22 may be interposed in inflow tubes 31, which will be described later, of the perfusate inflow parts 30.

The perfusate inflow parts 30 supply the perfusate from the reservoir 20 to the liver 9. Each perfusate inflow part 30 includes an inflow tube 31, a pump 32, a temperature regulating unit 33, a deaerating unit 34, and a pressure gauge 35. The pump 32, the temperature regulating unit 33, the deaerating unit 34, and the pressure gauge 35 are interposed in the inflow tube 31.

The inflow tubes 31 are connected at one ends to the reservoir 20. The inflow tubes 31 are also connected at the other ends to the organ to be perfused during the perfusion treatment. In the present embodiment, the other ends of the inflow tubes 31 are connected to blood vessels of the liver 9. This allows the perfusate to be supplied from the reservoir 20 to the blood vessels of the liver 9.

In the case where the perfusate is supplied from the two-line perfusate inflow parts 30 to the liver 9 as in the present embodiment, one of the inflow tubes 31 is connected to the portal vein of the liver 9, and the other inflow tube 31 is connected to the hepatic artery of the liver 9. In a liver of a living body, blood is supplied from the portal vein and the hepatic artery. The hepatic artery is an arterial blood vessel, so that the pressure of the blood in the hepatic artery is high. In contrast, the portal vein is a venous blood vessel, so that the pressure of the blood in the portal vein is extremely lower than the pressure in the hepatic artery. The perfusion device 100 including the two-line perfusate inflow parts 30 can individually set the pressure of the perfusate to be supplied to the hepatic artery and the pressure of the perfusate to be supplied to the portal vein.

The pumps 32 produce flows of the perfusate from the reservoir 20 to the liver 9 in the inflow tubes 31. For example, a pump equipped with a brushless motor is used as each pump 32. The temperature regulating units 33 regulate the temperature of the perfusate in the inflow tubes 31. For example, each temperature regulating unit 33 regulates the temperature of the perfusate in the inflow tube 31 to a set temperature by immersing part of the inflow tube 31 in a liquid whose temperature has been set to 4° C., 20° C., or 37° C., for example. The deaerating units 34 remove gas components of the perfusate in the inflow tubes 31. The pressure gauges 35 measure the pressure of the perfusate in the inflow tubes 31.

The perfusate outflow part 40 drains the perfusate from the liver 9. The perfusate outflow part 40 includes an outflow tube 41. The outflow tube 41 is connected at one end to an organ to be perfused during the perfusion treatment. In the present embodiment, the outflow tube 41 is connected to the suprahepatic inferior vena cava (SH-IVC) or infrahepatic inferior vena cava (IH-IVC) of the liver 9. The outflow tube 41 is also connected at the other end to the reservoir 20. This allows the perfusate drained from the suprahepatic inferior vena cava (SH-IVC) or infrahepatic inferior vena cava (IH-IVC) of the liver 9 to flow back into the reservoir 20. Alternatively, a pump that produces a flow of the perfusate from the liver 9 to the reservoir 20 may be interposed in the outflow tube 41.

The perfusion device 100 according to the present embodiment is configured to cause the perfusate drained from the liver 9 to flow back into the reservoir 20, but the present invention is not limited to this configuration. The perfusate drained from the liver 9 may be disposed of or accumulated in another container, instead of being sent back into the reservoir 20.

Note that each of the reservoir 20, the perfusate inflow parts 30, and the perfusate outflow part 40 may include a measuring unit for detecting a pH or a specific component under appropriate conditions. As another alternative, other devices such as a flowmeter or a solenoid valve that controls communication may be interposed in the inflow tubes 31 and the outflow tube 41.

The controller 50 is a unit for controlling operations of each component of the perfusion device 100. As schematically illustrated in FIG. 1, the controller 50 is configured as, for example, a computer that includes an arithmetic processor 51 such as a CPU, a memory 52 such as a RAM, and a storage 53 such as a hard disk drive.

In the case of using the perfusion device 100 in perfusion treatment, the liver 9 is connected to the two inflow tubes 31 and the one outflow tube 41. In some cases, another drainage tube for draining bile may be connected to the bile duct of the gallbladder removed together with the liver 9. In the case of transporting an organ connected to a plurality of tubes in this way, there is a possibility that the relative positions of the organ and the tubes may become shifted. In such a case, blood vessels connected to the tubes or tissues around the blood vessels may become damaged.

Meanwhile, there are cases where transplant operations are conducted while organs are connected to these tubes. In the case of operating an organ connected to the tubes in this way, there is also a possibility that the relative positions of the organ and the tubes may become shifted due to touching with an operator's hand or an appliance during the operation. In view of this, a frame described below taking the frame 1 as one embodiment can be used to suppress a shift in the relative positions of the organ and the tubes.

1-2. Configurations of Frame and Organ Holder

Figure 2:
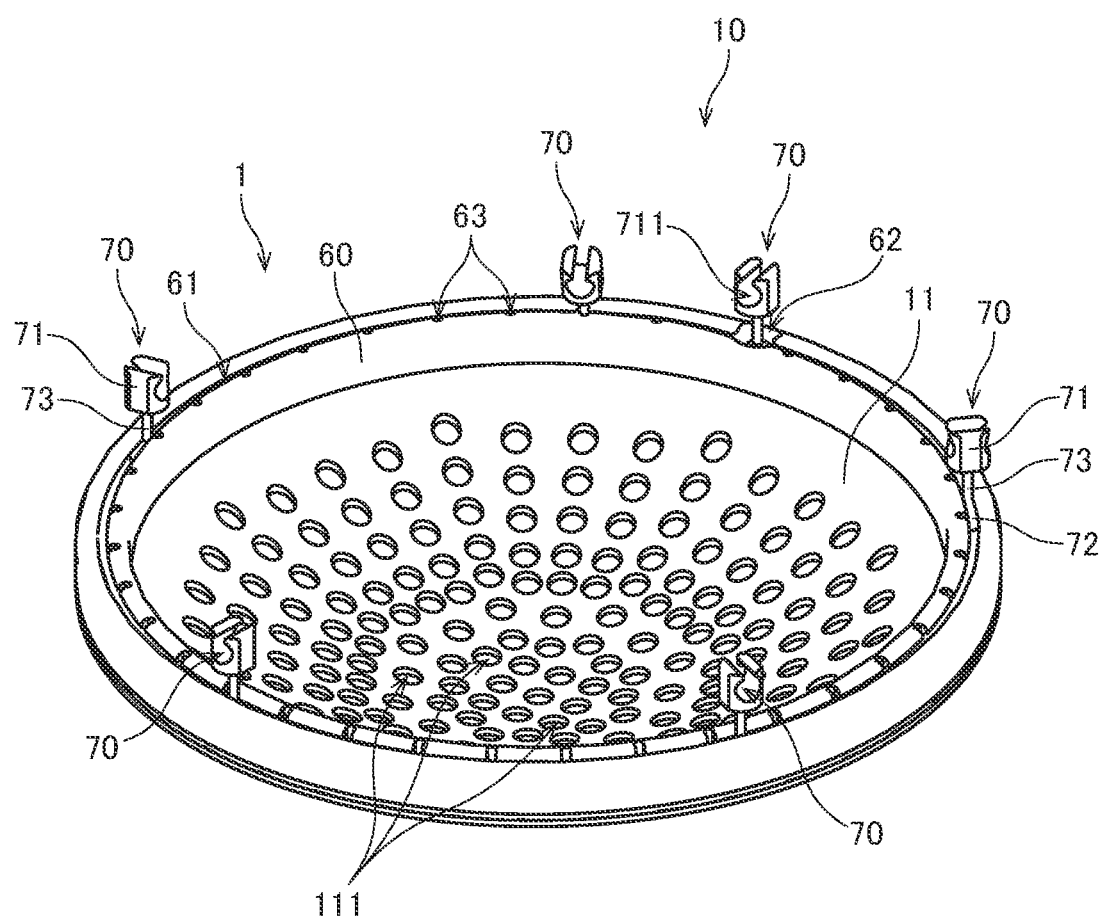
FIG. 2 is a perspective view of an organ holder according to the first embodiment.
Figure 3:
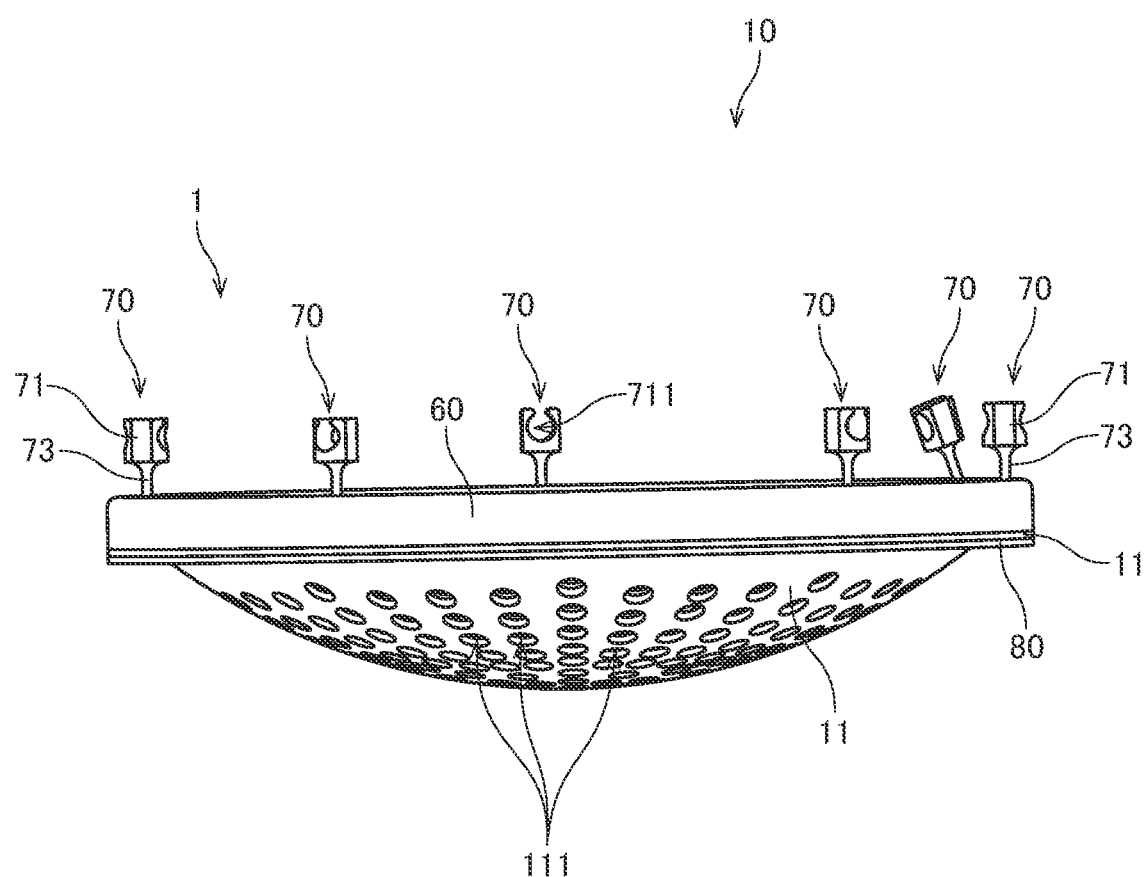
FIG. 3 is a side view of the organ holder according to the first embodiment.
Figure 4:
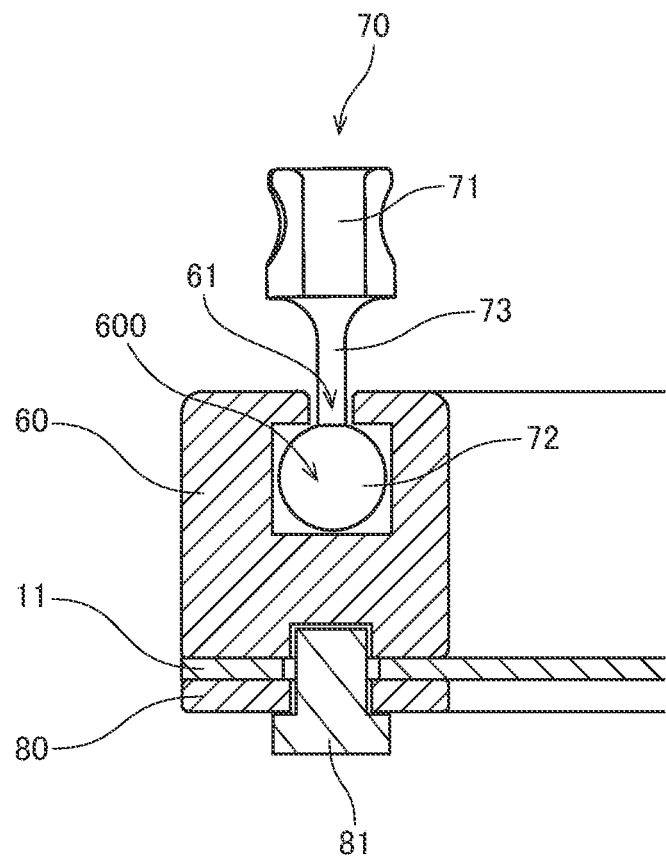
FIG. 4 is a partial sectional view of the organ holder according to the first embodiment.
Figure 5:
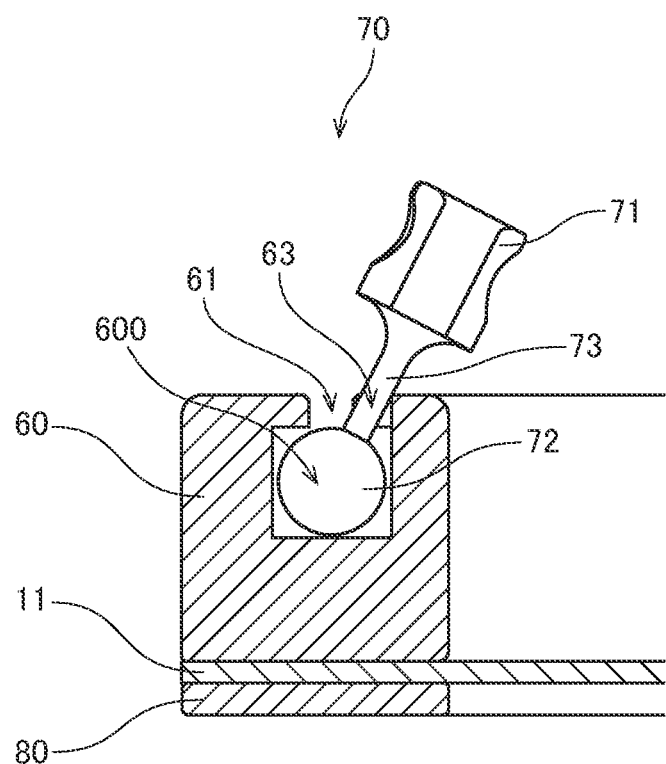
FIG. 5 is a partial sectional view of the organ holder according to the first embodiment.

Next, the organ holder 10 including the frame 1 according to the first embodiment of the present invention will be described with reference to FIGS. 2 to 4. FIG. 2 is a perspective view of the organ holder 10. FIG. 3 is a side view of the organ holder 10. FIGS. 4 and 5 are partial sectional views of the organ holder 10. In FIGS. 4 and 5, one tube clamp part 70 is illustrated in a side view, not in a section.

As illustrated in FIGS. 2 and 3, the organ holder 10 includes the frame 1 and a placement sheet 11 attached to the frame 1.

The frame 1 is an appliance for holding tubes connected to an organ in perfusion preservation of the organ. The frame 1 includes a body part 60, at least one tube clamp part 70 detachable from the body part 60, and a sheet fixing frame 80. In FIGS. 2 and 3, six tube clamp parts 70 are illustrated.

The body part 60 is a ring-shaped member locatable to surround the periphery of an organ. The "ring-shape" as used herein refers to a shape that includes not only a complete ring shape but also a partly open ring shape (e.g., a C-shaped ring). In the present embodiment, the body part 60 has roughly a circular figure, but the present invention is not limited thereto. The body part 60 may have roughly an oval figure, a polygonal figure such as quadrangular or hexagonal, or may have any other figure.

In the following description, in a top view in which the body part 60 has a circular shape, directions extending from the center of the body part 60 are each referred to as a "radial direction," and tangential directions of concentric circles about this center and the direction of extension of the body part 60 are each referred to as a "circumferential direction."

As illustrated in FIGS. 4 and 5, the body part 60 has an internal space 600 that continues in the circumferential direction. The internal space 600 is a space that extends in the direction of extension of the body part 60. In the present embodiment, the body part 60 includes one internal space 600 arranged along the entire length in the circumferential direction. Note that the body part 60 may include a plurality of internal spaces each extending along part of the length in the circumferential direction. For example, the body part may include three internal spaces each having a length equivalent to an interior angle of 110°.

As illustrated in FIG. 2, the body part 60 has a first opening 61 and a second opening 62 at the top, the first and second openings connecting the outside of the body part 60 and the internal space 600. The second opening 62 communicates with the first opening 61 in the circumferential direction. The first opening 61 has a radial width smaller than that of the internal space 600. The second opening 62 has a radial width greater than that of the first opening 61. In the present embodiment, the radial width of the second opening 62 is the same as the radial width of the internal space 600.

The first opening 61 is provided along the entire circumference of the body part 60, except a portion where the second opening 62 is provided. That is, the first opening 61 and the second opening 62 are arranged along the entire circumference at the top of the internal space 600. Alternatively, the internal space 600 may have a circumferential portion in which neither the first opening 61 nor the second opening 62 is provided.

Each tube clamp part 70 is a member that holds a tube connected to an organ when mounted on the body part 60. The tube clamp part 70 is mounted so as to be movable in the circumferential direction of the body part 60. As illustrated in FIGS. 4 and 5, the tube clamp part 70 includes a tube holder 71, a pull-out stopper 72, and a connector 73.

As illustrated in FIGS. 2 and 3, the tube holder 71 has a recess 711 for holding a tube. In the case of using the frame 1 to hold a tube connected to an organ, the tube is fitted into the recess 711 of the tube holder 71.

The pull-out stopper 72 has a width greater than that of the first opening 61 in any direction. However, the width of the pull-out stopper 72 is smaller than the width of the second opening 62. Thus, by disposing the pull-out stopper 72 through the second opening 62 into the internal space 600, it is possible to mount the tube clamp part 70 on the body part 60. Similarly, by taking out the pull-out stopper 72 through the second opening 62 from the inside of the internal space 600, it is possible to detach the tube clamp part 70 from the body part 60. As illustrated in FIG. 4, the pull-out stopper 72 in the present embodiment is spherical in shape.

On the other hand, the pull-out stopper 72 is unable to be moved in and out through the first openings 61 between an exterior space and the internal space 600. Accordingly, the tube clamp part 70 is unable to be mounted on and detached from the body part 60 at any circumferential position other than the position of the second opening 62.

The connector 73 is a columnar portion that directly connects the tube holder 71 and the pull-out stopper 72. The connector 73 is directly fixed at one end to the pull-out stopper 72. The connector 73 is also directly fixed at the other end to the tube holder 71. The connector 73 is thinner than the width of the first opening 61. As illustrated in FIG. 4, when the tube clamp part 70 is mounted on the body part 60, i.e., when the pull-out stopper 72 is located inside the internal space 600, the other end of the connector 73 and the tube holder 71 are located outside the body part 60.

As illustrated in FIGS. 2 and 5, the body part 60 includes a plurality of parts fixation portions 63 at the inner edge of the first opening 61. Each parts fixation portion 63 is a notch that is recessed inward from the edge of the first opening 61. Each parts fixation portion 63 is formed to a size that just fits the connector 73 of the tube clamp part 70. Accordingly, by inclining a tube clamp part 70 and fitting the connector 73 into a parts fixation portion 63 as illustrated in FIG. 5, it is possible to stop the circumferential movement of the tube clamp part 70. The inclination of the tube clamp part 70 can be adjusted in fine increments by adjusting the fitting depth of the connector 73 to the parts fixation portion 63. In particular, since the pull-out stopper 72 in the present embodiment is spherical in shape, the angle of the pull-out stopper 72 can be changed freely.

In this way, each tube clamp part 70 is mounted so as to be movable in the circumferential direction of the body part 60. By using this frame 1, a tube connected to the organ can be fixed at an appropriate position to a tube clamp part 70 of the frame 1 arranged around the organ. This stabilizes the relative positions of the organ and the tube. Accordingly, it is possible to reduce the probability of the organ becoming damaged due to a strain on the organ.

In the present embodiment, one second opening 62 and thirty-five parts fixation portions 63, i.e., thirty-six parts in total, are arranged at equal interior angle intervals of 10°. By arranging the parts fixation portions 63 at circumferential intervals in this way, it is possible to increase the degree of flexibility in the arrangement of tubes. This stabilizes the relative positions of the organ and tubes without putting a stain on the organ. As a result, the strain on the organ is further reduced.

In the case where sufficient static friction arises between the internal space 600 of the body part 60 and the pull-out stoppers 72, tubes can be fixed loosely by simply arranging the tube clamp parts 70 at positions other than the positions of the parts fixation portions 63 in the first opening 61. In the case of fixing tubes more tightly, appropriate usage methods may be devised, such as arranging the tube clamp parts 70 at the parts fixation portions 63.

In the present embodiment, the pull-out stoppers 72 are spherical in shape, so that the tube clamp parts 70 mounted on the body part 60 are rotatable in the horizontal direction. This enables adjusting the orientations of tubes held by the tube clamp parts 70.

As illustrated in FIG. 3, the sheet fixing frame 80 is a ring-shaped member arranged opposing the lower face of the body part 60. The sheet fixing frame 80 is fixed along the lower face of the body part 60 with fastening devices 81. The fastening devices 81 fix the body part 60 and the sheet fixing frame 80 with each other, with the placement sheet 11 sandwiched between the body part 60 and the sheet fixing frame 80. The fastening devices 81 are, for example, screws. In that case, the fastening devices 81 are fitted into screw holes in the sheet fixing frame 80, the through holes in the placement sheet 11, and screw holes in the lower face of the body part 60 as illustrated in FIG. 4.

The placement sheet 11 is a member for placing and holding an organ on its upper face. The placement sheet 11 is formed of, for example, a resin having an elastic force or a non-woven fabric. The type or number of the placement sheet 11 attached to the frame 1 are appropriately selected depending on the type of an organ to be preserved or the purpose of preserving an organ. For example, two types of placement sheet 11 may be used in an overlapping manner.

The relative positions of the organ and tubes fixed to the tube clamp parts 70 can be further stabilized by holding the organ on the placement sheet 11 fixed to the frame 1. This further reduces the strain on the organ.

In FIGS. 2 and 3, the placement sheet 11 is bowed inward and downward of the lower edge of the frame 1 at the center. The placement sheet 11 may have such a bowl-like shape in advance. Alternatively, before placing an organ, the placement sheet 11 may have a flat shape along the lower edge of the frame 1 and may become bowl-shaped as illustrated by the weight of the organ placed thereon. As another alternative, for example, the placement sheet 11 may not become much deformed and may become bowed inward very little, like a placement sheet 11A according to a second embodiment, which will be described later.

In the present embodiment, the placement sheet 11 has a plurality of through holes 111. These through holes 11 allows a liquid to pass through above and below the placement sheet 11. Accordingly, if the organ holder 10 with the placement sheet 11 attached to the frame 1 is set in the reactor 90, the organ placed on the placement sheet 11 can be immersed in a liquid that fills the inside of the reactor 90.

The placement sheet 11 according to the present embodiment is a sheet formed of a non-woven fabric or a resin and having the through holes 111, but the present application is not limited thereto. For example, the placement sheet 11 may be formed of a reticulate mesh fabric or a net.

The frame 1 may be used singly, instead of being used in combination with the placement sheet 11. For example, in the case of giving treatment to an organ preserved in the reactor 90 or an organ preserved in a living body before and after organ removal or transplantation while connecting the organ to a plurality of tubes, the frame 1 is located so as to surround the organ, and tubes connected to the organ or tubes to be connected to the organ are fixed to the tube clamp parts 70. This reduces the probability that the tubes connected to the organ may move and put a stain on the organ during organ treatment.

In the present embodiment, the body part 60, the tube clamp parts 70, and the sheet fixing frame 80 of the frame 1 are all formed of heat-resistant resins. Examples of the heat-resistant resins include polycarbonate, polypropylene, and polytetrafluoroethylene (PTFE). Using such heat-resistant materials for the frame 1 enables autoclave sterilization of the frame 1.

In the case of sterilizing the frame 1 through ethylene oxide gas (EOG) sterilization, each component of the frame 1 may be formed of other resins such as nylon. The frame 1 may also be disposable. In that case, the sterilization of the frame 1 is unnecessary.

2. Second Embodiment

Next, an organ holder 10A including a frame 1A according to the second embodiment of the present invention will be described with reference to FIGS. 6 to 9. The following description omits a description of some components that are common to those of the frame 1 according to the first embodiment. Constituent elements that are equivalent to or correspond to those of the first embodiment are given the reference numerals with "A" attached to the corresponding reference numerals in the first embodiment.

Figure 6:
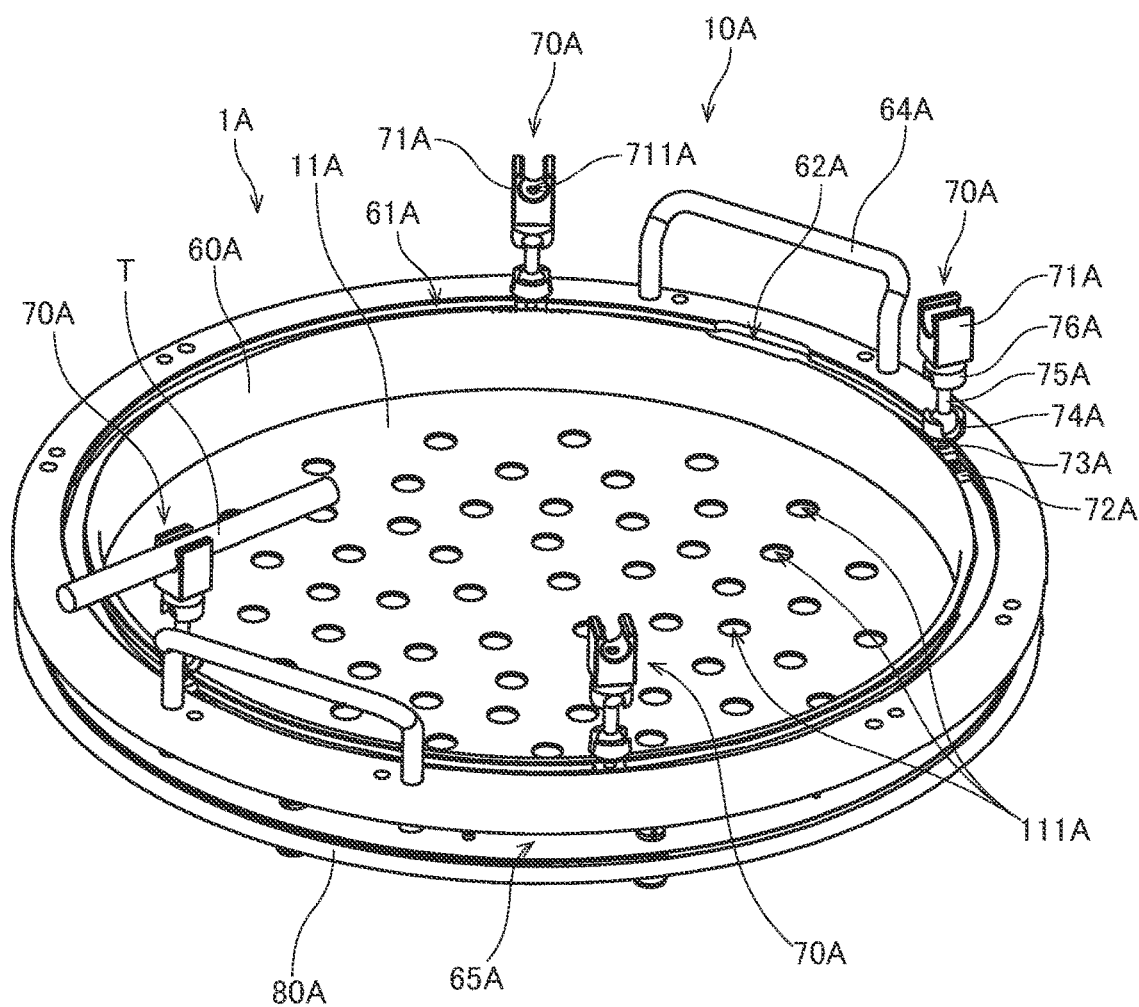
FIG. 6 is a perspective view of an organ holder according to a second embodiment.
Figure 7:
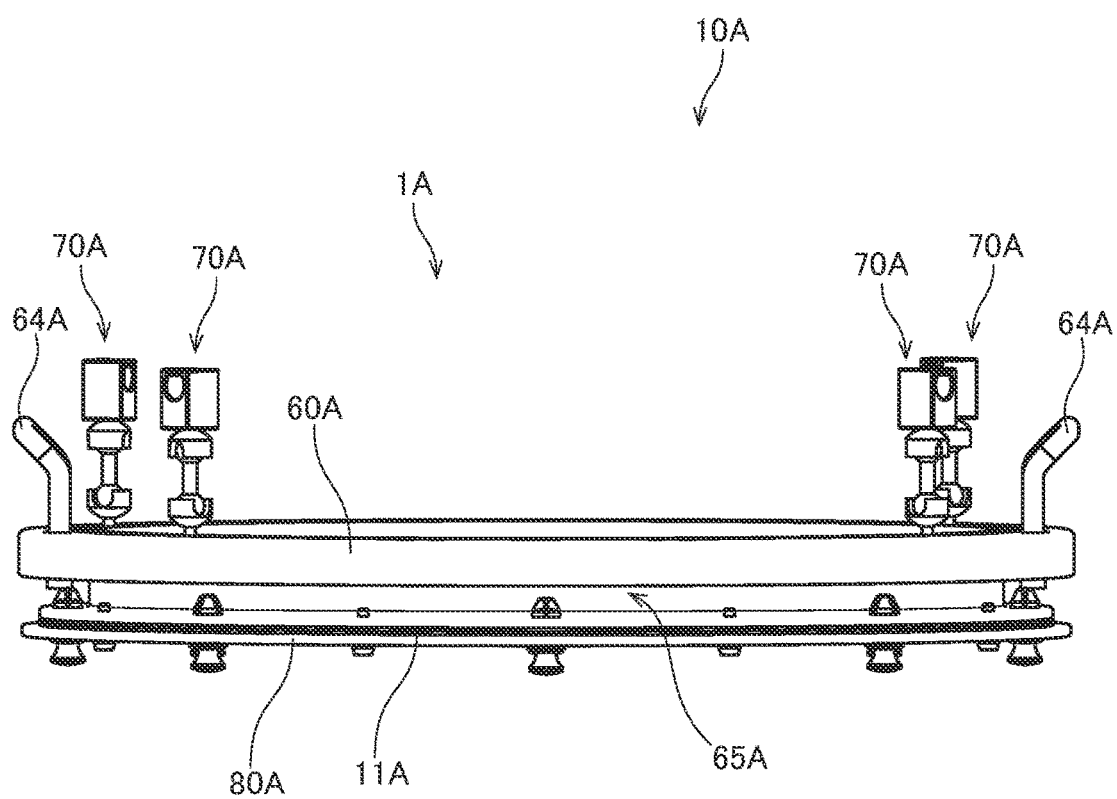
FIG. 7 is a side view of the organ holder according to the second embodiment.
Figure 8A:
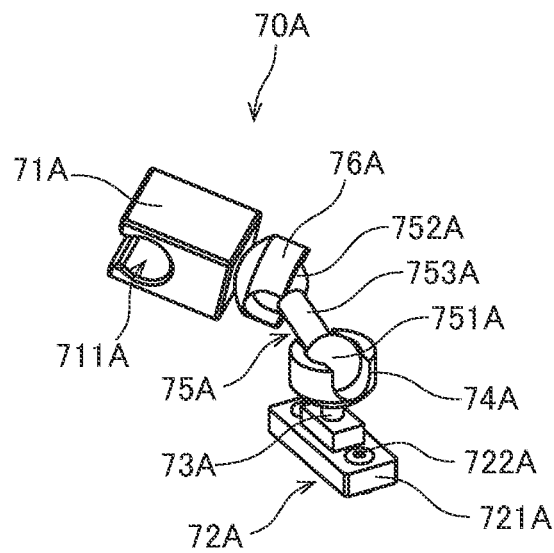
FIGS. 8A to 8D are perspective views illustrating variations in the posture of a tube clamp part according to the second embodiment.
Figure 8B:
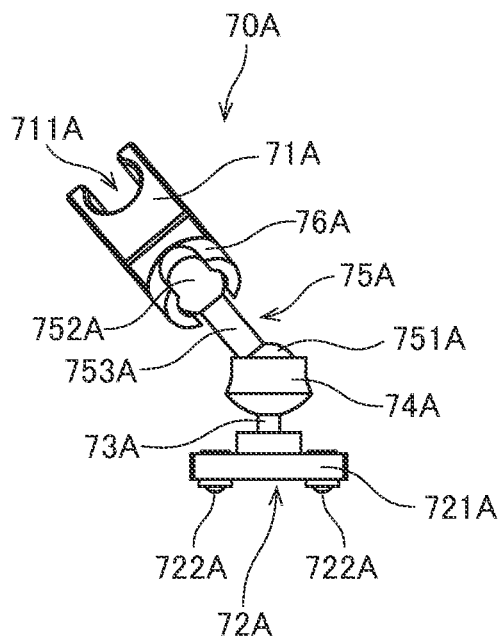
Figure 8C:
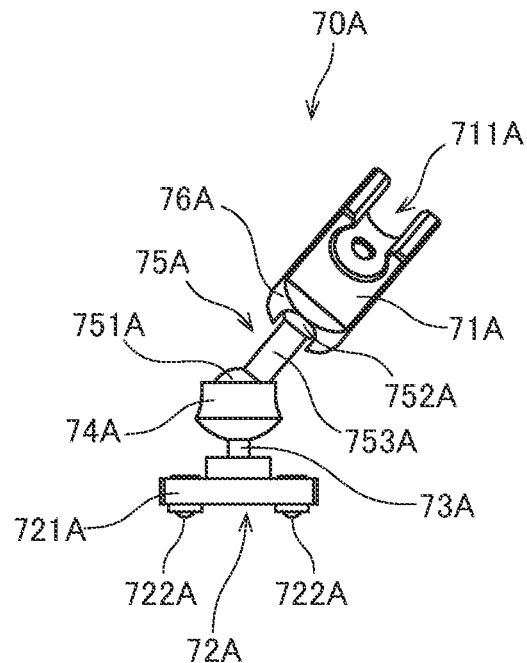
Figure 8D:
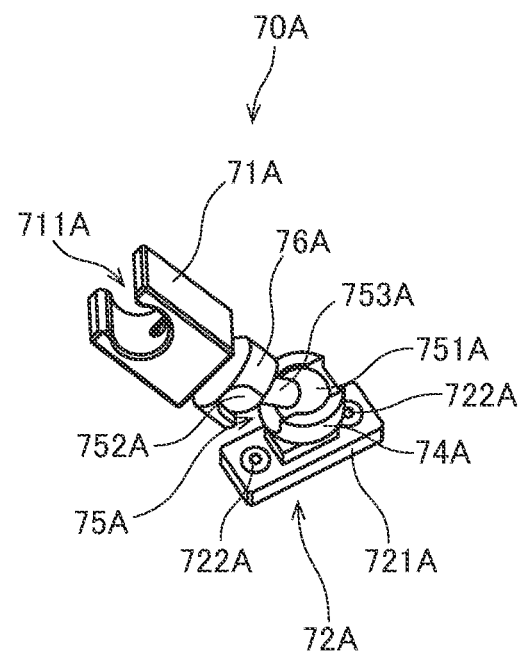
Figure 9:
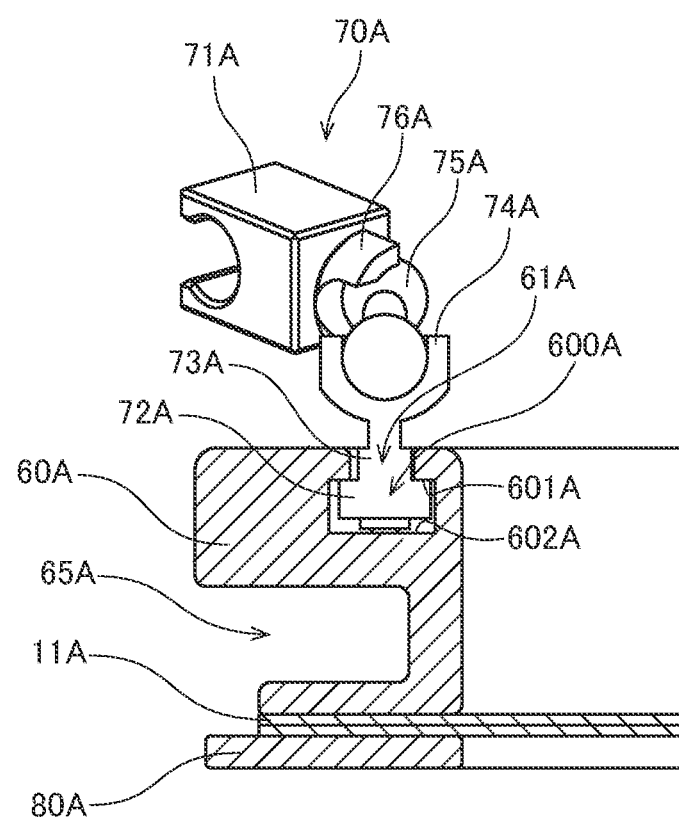
FIG. 9 is a partial sectional view of the organ holder according to the second embodiment.

FIG. 6 is a perspective view of the organ holder 10A. In FIG. 6, part of a tube T held by one tube clamp part 70A is illustrated. FIG. 7 is a side view of the organ holder 10A. FIGS. 8A to 8D are perspective views illustrating variations in the posture of each tube clamp part 70A. FIG. 9 is a partial sectional view of the organ holder 10A.

As illustrated in FIGS. 6 and 7, the organ holder 10A includes the frame 1A and a placement sheet 11A attached to the frame 1A.

The frame 1A includes a body part 60A, at least one tube clamp part 70A detachable from the body part 60A, and a sheet fixing frame 80A. In FIGS. 6 and 7, four tube clamp parts 70A are illustrated.

As illustrated in FIG. 9, the body part 60A has an internal space 600A that continues in the circumferential direction. In the present embodiment, the body part 60A has one internal space 600A arranged along the entire length in the circumferential direction.

The body part 60A has a first opening 61A and a second opening 62A at the top, the first and second openings connecting the outside of the body part 60A and the internal space 600A. The first opening 61A is provided along the entire circumference of the body part 60A, except a portion where the second opening 62A is provided. The first opening 61A has a radial width smaller than that of the internal space 600A. The second opening 62A has a radial width greater than that of the first opening 61A. In the present embodiment, the radial width of the second opening 62A is the same as the radial width of the internal space 600A.

As illustrated in FIGS. 8A to 8D, each tube clamp part 70A includes a tube holder 71A, a pull-out stopper 72A, a connector 73A, a first socket 74A, a double-ball member 75A, and a second socket 76A.

As illustrated in FIGS. 6, 7, and 8A to 8D, the tube holder 71A has a recess 711A for holding a tube. In the case of using the frame 1A to hold a tube connected to an organ, the tube is fitted into the recess 711A of the tube holder 71A.

As illustrated in FIGS. 8A to 8D, the pull-out stopper 72A includes a generally rectangular pull-out stopper plate 721A and two plungers (biasing members) 722A. The plungers 722A are, for example, ball plungers.

When each tube clamp part 70A is mounted on the body part 60A, the pull-out stopper plate 721A is located inside the internal space 600A. At this time, the tube clamp part 70A is mounted such that the short sides of the pull-out stopper plate 721A are oriented in the radial direction of the body part 60A and the long sides of the pull-out stopper plate 721A are oriented in the circumferential direction of the body part 60A. The connector 73A is fixed at one end to the center on the upper side of the pull-out stopper plate 721A. On the opposite sides of the connector 73A in the longitudinal direction of the pull-out stopper plate 721A, the balls of the plungers 722A are fixed so as to be exposed to the underside of the pull-out stopper plate 721A. Thus, when the plungers 722A contract in the up-down direction, the pull-out stopper plate 721A is biased upward.

Here, the radial width of the second opening 62A is greater than the length of the short sides of the pull-out stopper plate 721A. Also, the circumferential width of the second opening 62A is greater than the length of the long sides of the pull-out stopper plate 721A. Thus, it is possible to mount the pull-out stopper 72A through the second opening 62A from the outside to the inside of the internal space 600A and to detach the pull-out stopper 72A through the second opening 62A from the internal space 600A to the outside.

On the other hand, the widths of the short sides and the long sides of the pull-out stopper plate 721A are greater than the width of the first opening 61A. Thus, the pull-out stopper 72A is unable to be moved in and out through the first opening 61A between the exterior space and the internal space 600A. Accordingly, the tube clamp part 70A is unable to be mounted on and detached from the body part 60A at any circumferential position other than the position of the second opening 62A.

The connector 73A is a portion that indirectly connects the tube holder 71A and the pull-out stopper 72A. The connector 73A has a rectangular parallelepiped shape on one side and is directly fixed to the pull-out stopper 72A. The connector 73A also has a columnar shape on the other side and has the end on the other side fixed directly to the first socket 74A.

The double-ball member 75A includes a spherical first ball 751A, a spherical second ball 752A, and a rod-like ball connector 753A that connects the two balls 751A and 752A. The first socket 74A has a recessed face that is in contact with the spherical surface of the first ball 751A. Fitting the first ball 751A into the first socket 74A forms a first ball joint that provides spherical articulated coupling.

On the other hand, the tube holder 71A is directly fixed to the second socket 76A. The second socket 76A has a recessed face that is in contact with the spherical surface of the second ball 752A. Fitting the second ball 752A into the second socket 76A forms a second ball joint that provides spherical articulated coupling.

In this way, the connector 73A connects the tube holder 71A and the pull-out stopper 72A via the two ball joints configured of the first socket 74A, the double-ball member 75A, and the second socket 76A. Accordingly, the tube holder 71A has a high degree of flexibility in changing the relative positions and angles of the pull-out stopper 72A and the connector 73A.

As illustrated in FIGS. 6 and 9, when the tube clamp parts 70A are mounted on the body part 60A, i.e., when the pull-out stoppers 72A are located inside the internal space 600A, parts of the connectors 73A are located inside the first opening 61A, and the upper ends of the connectors 73A, the first sockets 74A, the double-ball members 75A, the second sockets 76A, and the tube holders 71A are located outside the body part 60A.

As illustrated in FIG. 9, the internal space 600A is delimited by the inner wall that includes an upper inner wall and a lower inner wall, the upper inner wall of the internal space 600A being referred to as a first inner wall 601A, and the lower inner wall of the internal space 600A being referred to as a second inner wall 602A. The first inner wall 601A and the second inner wall 602A oppose each other. When the pull-out stopper 72A of each tube clamp part 70A is located inside the internal space 600A, springs in the plungers 722A are compressed to a small extent. Thus, the plungers 722A stretch between the first inner wall 601A and the second inner wall 602A and give resistance to the first inner wall 601A and the second inner wall 602A. As a result, friction is developed between the upper face of the pull-out stopper plate 721A and the first inner wall 601A, and this restricts the circumferential movement of the tube clamp part 70A.

In the case of changing the circumferential position of the tube clamp part 70A, the tube clamp part 70A can be moved by being pressed down. When the tube clamp part 70A is pressed down, the springs in the plungers 722A are further compressed, and this reduces the resistance and friction between the upper face of the pull-out stopper plate 721A and the first inner wall 601A. Therefore, the tube clamp part 70A can be moved with ease.

By using these tube clamp parts 70A, it is possible to fix and use the tube clamp parts 70A in any place within the range of existence of the first opening 61A. Accordingly, the position of the tubes held by the tube clamp parts 70A can be adjusted in fine increments.

In the present embodiment, the body part 60A, the tube clamp parts 70A, and the sheet fixing frame 80A of the frame 1A, except the plungers 722A, are all formed of heat-resistant resins. The plungers 722A are formed of a metal. In this way, the use of heat-resistant materials and a metal to form the frame 1A enables autoclave sterilization of the frame 1A.

In the present embodiment, handles 64A for lifting the frame 1A may be attached to the top of the body part 60A, as illustrated in FIGS. 6 and 7. This allows the organ holder 10A to be carried stably.

In the present embodiment, the outer side face of the body part 60A has a holding groove 65A arranged along the entire circumference as illustrated in FIG. 7. Thus, in the case of grasping the body part 60A itself to lift the frame 1A, an operator is able to get his/her fingers caught in the holding groove 65A to hold the body part 60A. This allows the organ holder 10A to be carried stably.

The holding groove 65A may be provided only in part of the outer side face of the body part 60A. The holding groove 65A preferably has a width greater than or equal to 1.5 cm in the up-down direction. This enables an operator to readily insert his/her fingers into the holding groove 65A.

3. Variations

While embodiments of the present invention have been described thus far, the present invention is not limited to the above-described embodiments.

In both of the frames 1 and 1A according to the above-described embodiments, the tube clamp parts 70 and 70A are movable along almost the entire circumference of the body parts 60 and 60A, but the present invention is not limited thereto. The tube clamp parts may be configured to be mountable at predetermined several positions in the circumferential direction of the body part.

In the frames 1 and 1A according to the above-described embodiments, part of the tube clamp parts 70 and 70A can be located inside the body parts 60 and 60A, but the present invention is not limited thereto. The tube clamp parts may be mounted on a mounting mechanism provided on the outer surface of a body part.

Each element described in the above-described embodiments and variations may be appropriately combined within a range that presents no contradictions.

While the invention has been shown and described in detail, the foregoing description is in all aspects illustrative and not restrictive. It is therefore to be understood that numerous modifications and variations can be devised without departing from the scope of the invention.

What is claimed is:

1. A frame for holding a tube connected to an organ during perfusion preservation of the organ, the frame comprising:

a ring-shaped body part locatable to surround a periphery of said organ; and at least one tube clamp part mounted on said body part, wherein said body part has:
 an internal space defined in a circumferential direction of said body part, and
 a first opening that connects an outside of said body part and said internal space and extends in a direction of extension of said body part, said tube clamp part includes:
 a tube holder that holds said tube,
 a pull-out stopper having a width greater than a width of said first opening, and
 a columnar connector having a width smaller than the width of said first opening, said tube clamp part is mounted to be movable in the circumferential direction of said body part, said columnar connector is directly fixed at one end to said pull-out stopper, said columnar connector is directly or indirectly connected at the other end to said tube holder, and when said tube clamp part is mounted on said body part, said pull-out stopper is located inside said internal space, and the other end of said columnar connector and said tube holder are located outside said body part.

2. The frame according to claim 1, wherein
said body part further has:
a second opening that connects an outside of said body part and said internal space and communicates with said first opening in the circumferential direction, and
said second opening has a size that allows said pull-out stopper to pass through.

3. The frame according to claim 1, wherein
said body part includes:
a plurality of parts fixation portions arranged at intervals in the circumferential direction, and
said plurality of parts fixation portions are notches that are recessed from an edge of said first opening, and are capable of fitting with said columnar connector.

4. The frame according to claim 1, wherein
said internal space of said body part is delimited by an inner wall that includes:

a first inner wall in which said first opening is provided; and a second inner wall opposing said first inner wall,
said pull-out stopper includes:
a biasing member that stretches between said first inner wall and said second inner wall and gives resistance to said first inner wall and said second inner wall.

5. The frame according to claim 1, wherein said tube clamp part includes:
one or two ball joints existing between said columnar connector and said tube holder, said one or two ball joints each include:
a spherical ball; and
a socket having a recessed face that is in contact with a spherical surface of said spherical ball.

6. The frame according to claim 1, being formed of only a heat-resistant resin or of a heat-resistant resin and a metal.

7. The frame according to claim 1, wherein
said body part includes:
a holding groove provided in an outer side face of said body part.

8. A frame for holding a tube connected to an organ during perfusion preservation of the organ, the frame comprising:
a ring-shaped body part locatable to surround a periphery of said organ; and
at least one tube clamp part mounted on said body part,
a ring-shaped sheet fixing frame arranged opposing a lower face of said body part; and
a fastening device that fixes said body part and said sheet fixing frame in a state in which a placement sheet on which said organ is placed is sandwiched between said body part and said sheet fixing frame, wherein
said tube clamp part includes a tube holder that holds said tube, and
said tube clamp part is mounted to be movable in a circumferential direction of said body part.

9. An organ holder for holding an organ connected to a tube during perfusion preservation of the organ, the organ holder comprising:
the frame according to claim 8; and
said placement sheet fixed between said body part and said sheet fixing frame.

* * * * *